P. WINEMAN.
Churn.
No. 24,898.
Patented July 26, 1859.
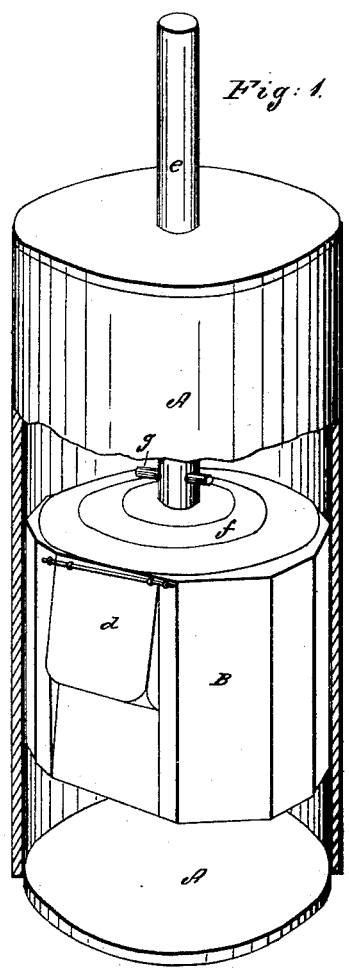
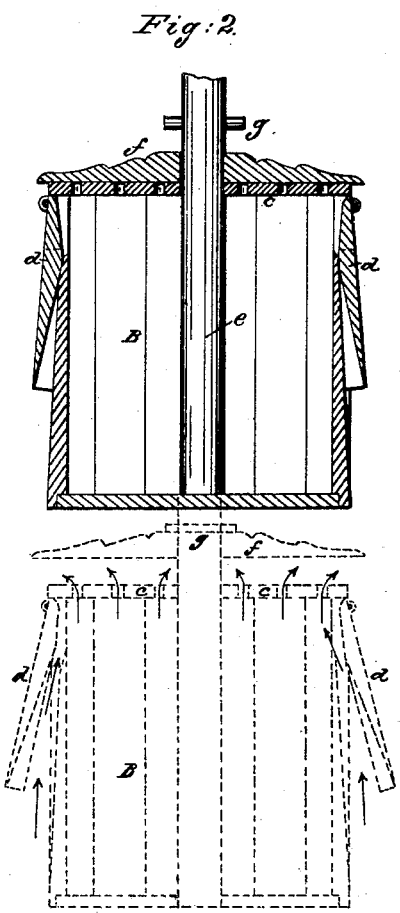
Witnesses:
Thos Michener
John S Hutchison
Inventor:
Parker Wineman

UNITED STATES PATENT OFFICE.

PARKER WINEMAN, OF LOYDSVILLE, OHIO.

CHURN-DASHER.

Specification of Letters Patent No. 24,898, dated July 26, 1859.

*To all whom it may concern:*

Be it known that I, PARKER WINEMAN, of Loydsville, in the county of Belmont and State of Ohio, have invented a new and useful Improvement in Churn-Dashers; and I do hereby declare that the following is a full, clear, and exact description thereof, reference being had to the accompanying drawings and to the letters of reference marked thereon and made to form a part of this specification.

My invention relates to certain improvements in the construction and arrangement of churn dashers, by means of which the operation of churning may be accomplished in less time, and more butter secured from the same quantity of cream, than, by churn dashers now in common use.

In reference to the accompanying drawings, Figure 1 is a perspective view showing the dasher in working position within the shell of a churn. Fig. 2, is a vertical sectional view of the dasher, the black lines showing it in an ascending, and the red lines in a descending position.

(A) represents the shell of a churn, a portion of which is removed to show the position of the dasher.

(B) represents the cylindrical dasher formed with a perforated top (*c*) and provided with hinged valves (*d, d*) and attached to a vertical central shaft (*e*) by means of which it is made to operate.

(*f*) is a cover or cap formed to fit the top of the dasher and to slide up and down upon the shaft (*e*) its upward motion being controlled by the stop (*g*).

The operation of my invention may be described as follows: As the dasher is forced downward, the cream is forced under the valves (*d*) into the dasher, where it instantly mingles with the contained air, and is forced through the perforations (*i*) of the top of the dasher (*c*) against the cap with such violence as to burst the particles of cream or milk in which the butter is contained. The butter which passes into the dasher, with the cream, will fall to the bottom of the dasher, so that when the operation of churning is completed the butter will be gathered in the dasher, a segment of which may then be taken out and the butter removed for curing.

The valves for the admission of air and cream may be arranged in various ways, differing from that represented, but I prefer the arrangement herein described.

What I claim as my invention and desire to secure by Letters Patent is—

A cylindrical dasher for churns, formed with a perforated top, provided with a movable cap or cover, and with hinged valves arranged in such manner, that cream may be received within the dasher at each downward motion thereof, and all, operating substantially as herein described for the purposes set forth.

In testimony of which invention I have hereunto set my hand.

PARKER WINEMAN.

Witnesses:
  THOS. MICHENER,
  JOHN S. HUTCHISON.